(12) United States Patent
Yamano

(10) Patent No.: US 8,159,596 B2
(45) Date of Patent: Apr. 17, 2012

(54) INFRARED-ABSORBING FILTER WITH MULTILAYER FILM IN IMAGING OPTICAL SYSTEM

(75) Inventor: Hiroki Yamano, Tokyo (JP)

(73) Assignee: Sony Corporation (JP)

( * ) Notice: Subject to any disclaimer, the term of this patent is extended or adjusted under 35 U.S.C. 154(b) by 61 days.

(21) Appl. No.: 12/806,547

(22) Filed: Aug. 16, 2010

(65) Prior Publication Data

US 2011/0051230 A1 Mar. 3, 2011

(30) Foreign Application Priority Data

Aug. 26, 2009 (JP) .............................. P2009-195506

(51) Int. Cl.
*H04N 5/225* (2006.01)
(52) U.S. Cl. ........................ 348/342; 359/359
(58) Field of Classification Search .................. 348/342; 359/359
See application file for complete search history.

(56) References Cited

U.S. PATENT DOCUMENTS

| | | | | |
|---|---|---|---|---|
| 4,621,889 | A * | 11/1986 | Chikano et al. | 359/359 |
| 6,980,250 | B1 * | 12/2005 | Kayanuma et al. | 348/342 |
| 7,038,722 | B2 * | 5/2006 | Kitagishi | 348/272 |
| 7,411,729 | B2 * | 8/2008 | Iyama et al. | 359/354 |
| 7,494,232 | B2 * | 2/2009 | Wu et al. | 359/607 |
| 2005/0068456 | A1 * | 3/2005 | Ohta et al. | 348/360 |
| 2005/0181128 | A1 * | 8/2005 | Nikolov et al. | 427/248.1 |
| 2006/0132641 | A1 * | 6/2006 | Hayakawa | 348/342 |
| 2008/0100910 | A1 * | 5/2008 | Kim et al. | 359/356 |
| 2008/0285119 | A1 * | 11/2008 | Iyama et al. | 359/359 |

FOREIGN PATENT DOCUMENTS

| | | | |
|---|---|---|---|
| JP | 2002050751 A | * | 2/2002 |
| JP | 2004-345680 A | | 12/2004 |

* cited by examiner

*Primary Examiner* — Mark Consilvio
(74) *Attorney, Agent, or Firm* — Lerner, David, Littenberg, Krumholz & Mentlik, LLP

(57) ABSTRACT

An optical element includes: a base material formed of a film-like resin material that has an infrared absorbing effect; and a multilayered film that adjusts spectral characteristics, and is formed on an object-side surface and an image-side surface of the base material. The optical element is disposed on a light path of an imaging optical system, and of such characteristics that its spectral transmittance, and its spectral reflectivities on the object-side surface and the image-side surface satisfy the conditions (1) to (4)

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where
$T_{IRCF\,(600)}$, $T_{IRCF\,(540)}$, and $T_{IRCF\,(700)}$ are the spectral transmittances of light with wavelength of 600 nm, 540 nm, and 700 nm, respectively, and
$\lambda_{LT50\%}$ and $\lambda_{LR50\%}$ are the wavelengths of near-infrared light at 50% spectral transmittance and 50% spectral reflectivity, respectively.

8 Claims, 12 Drawing Sheets

FIG.5
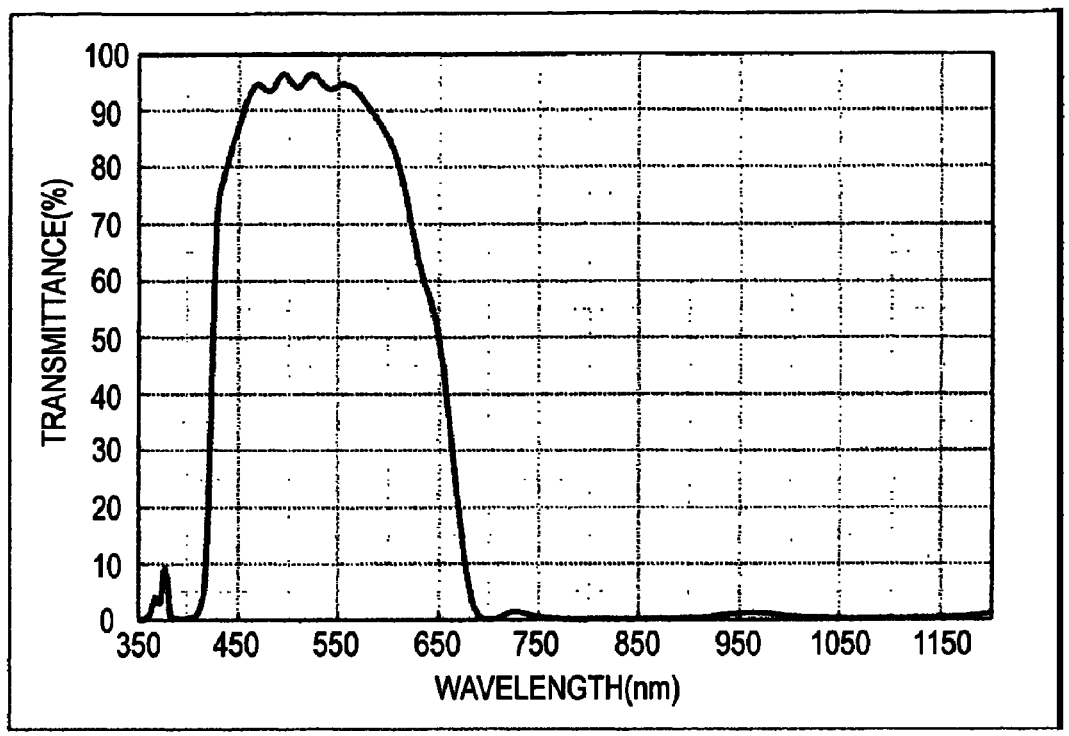
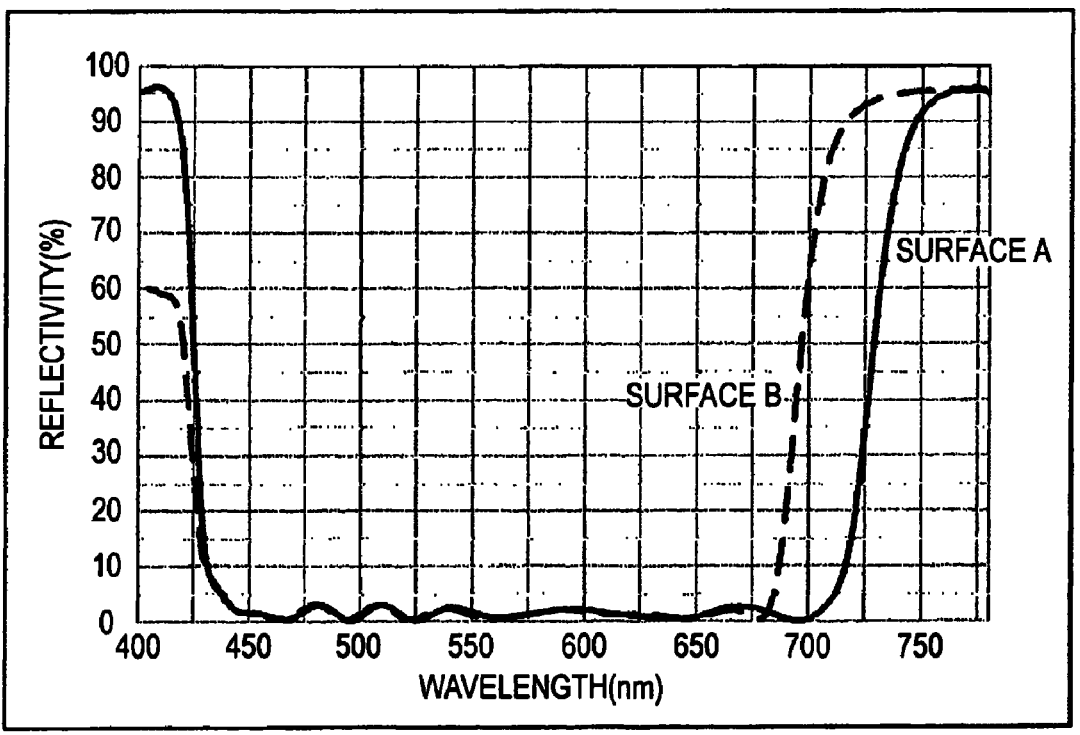

FIG.6
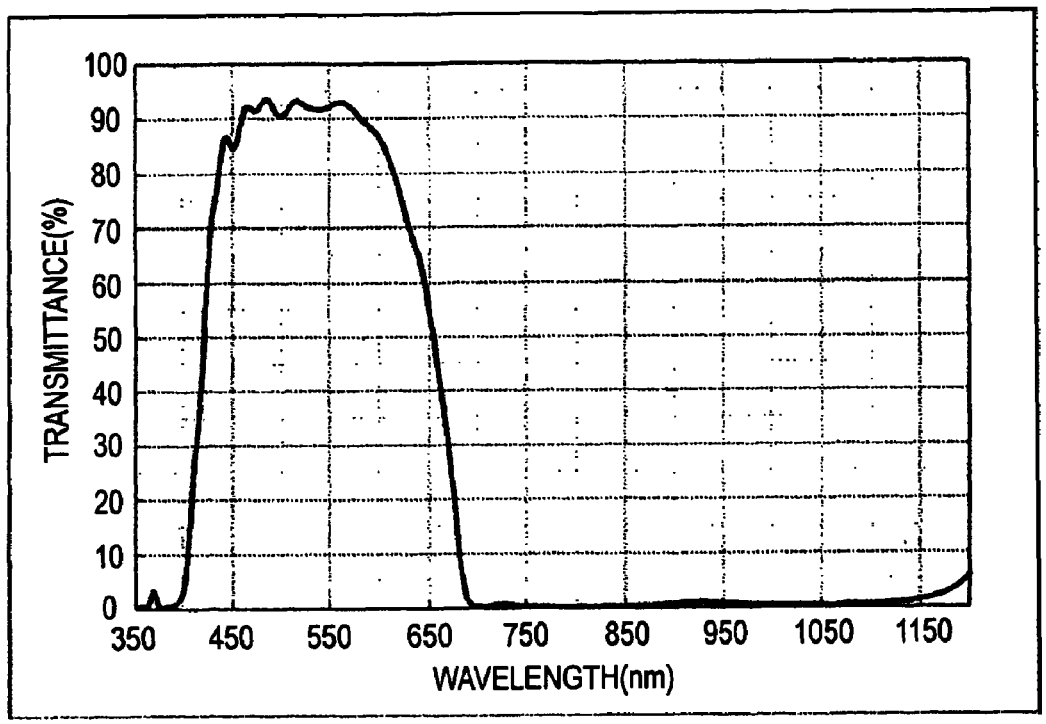
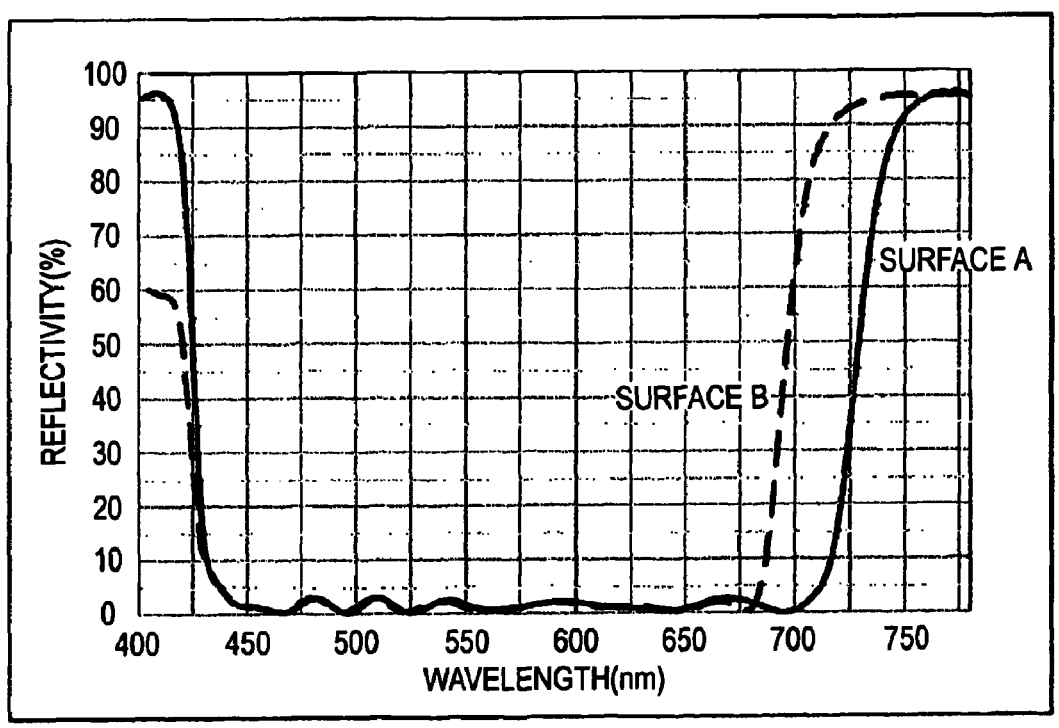

FIG.7
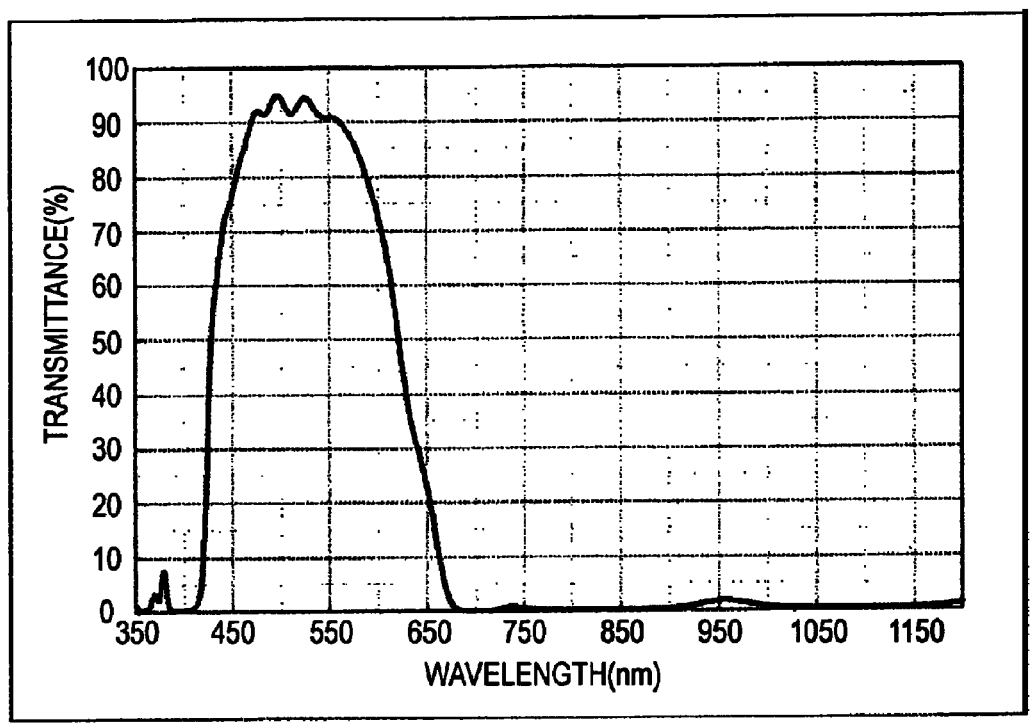
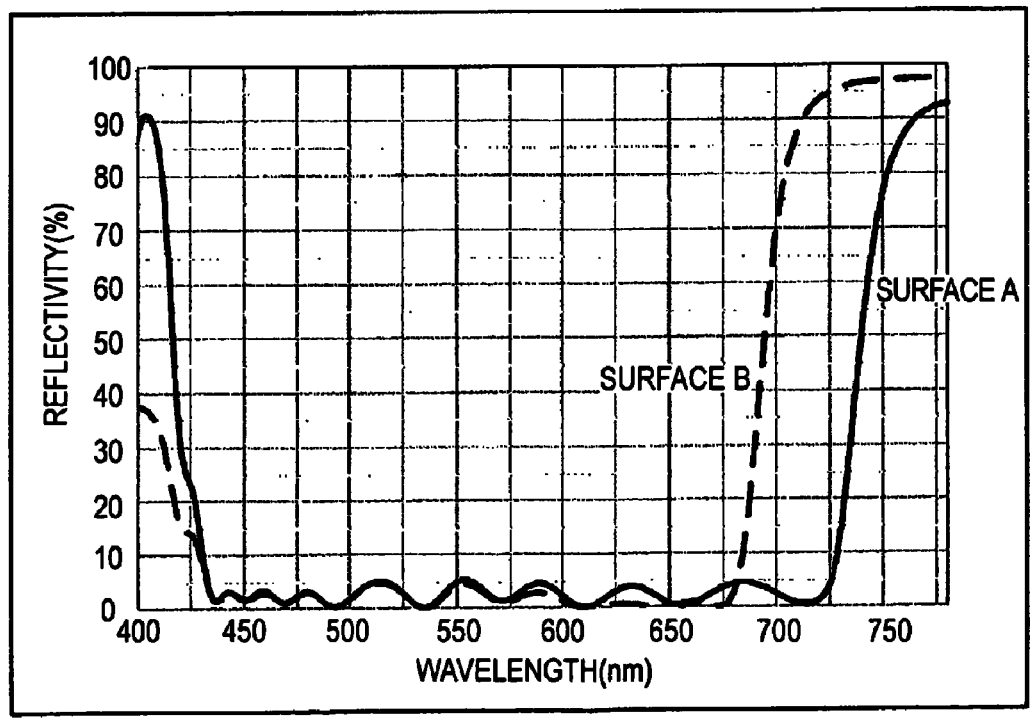

FIG.10
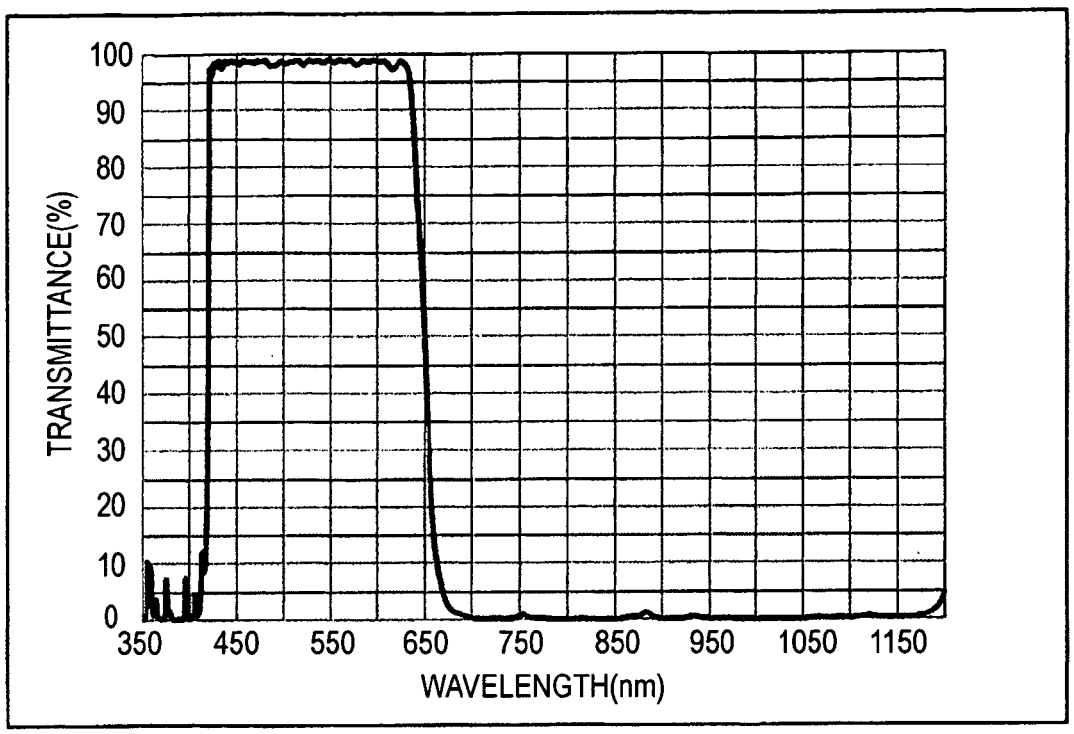
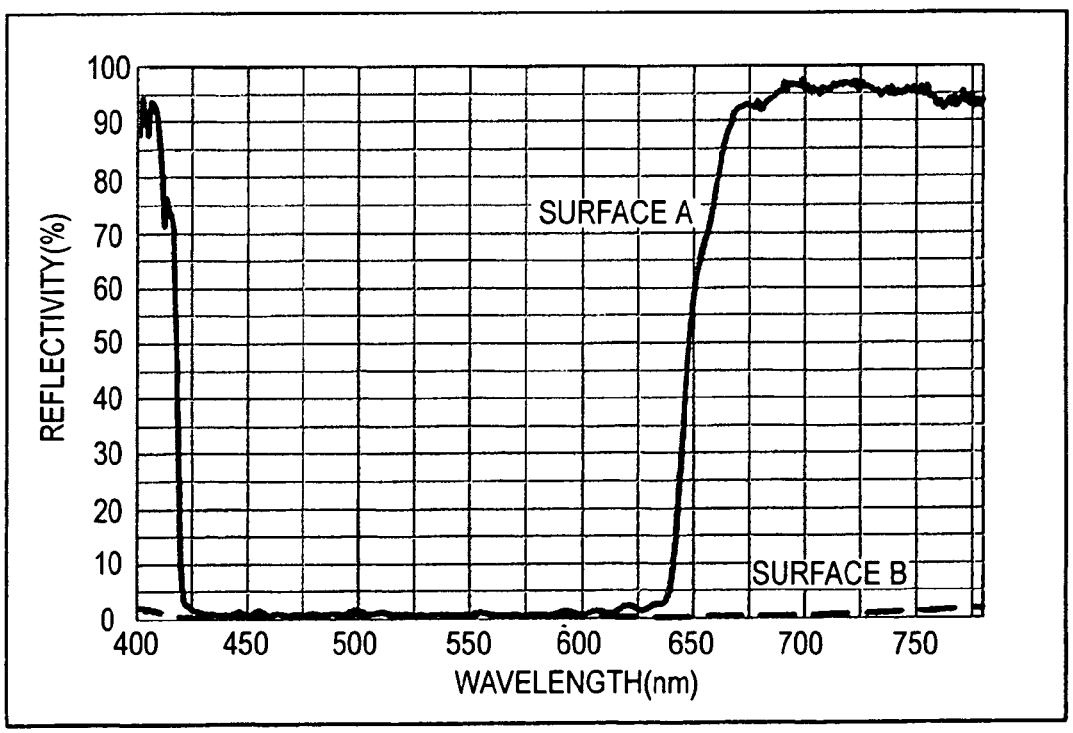

FIG.11
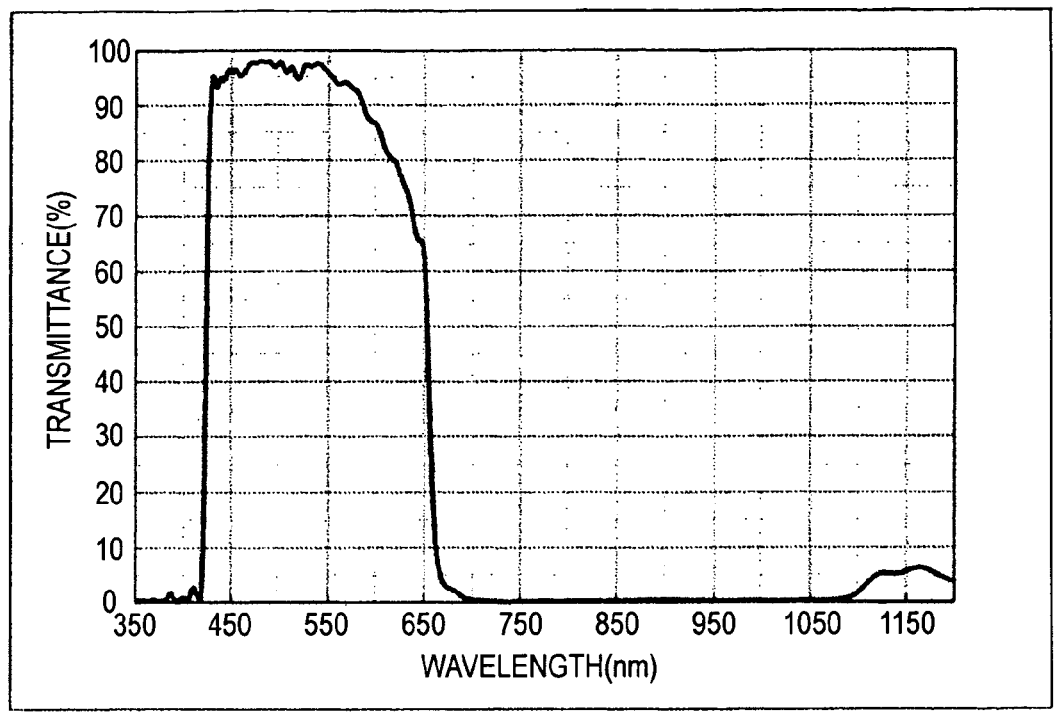
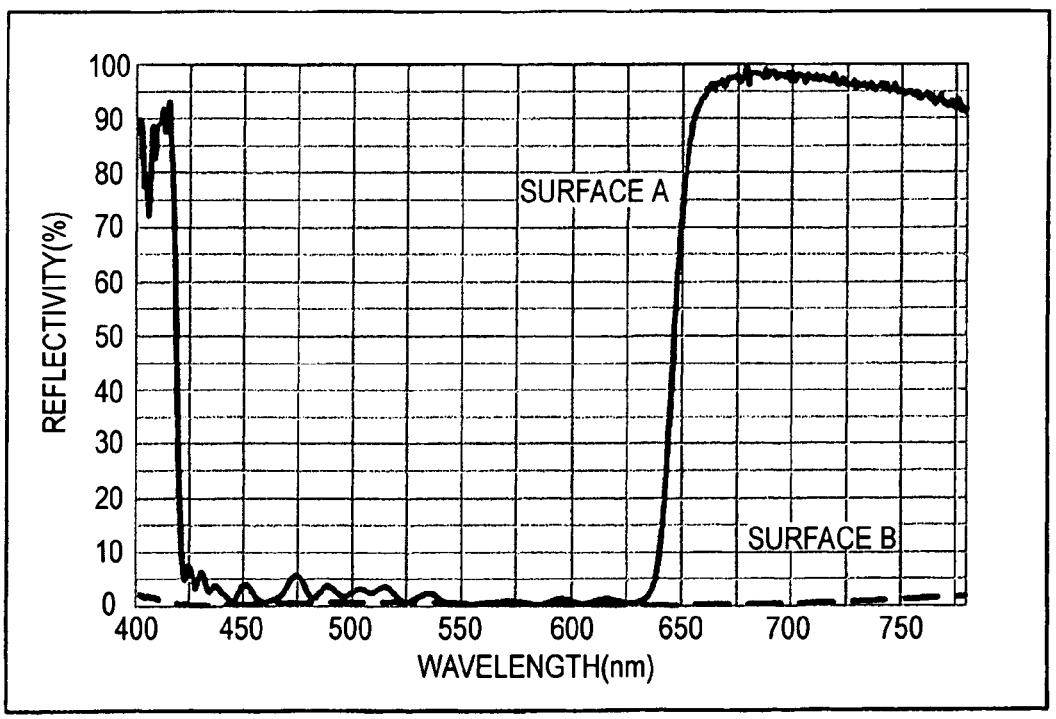

FIG.12
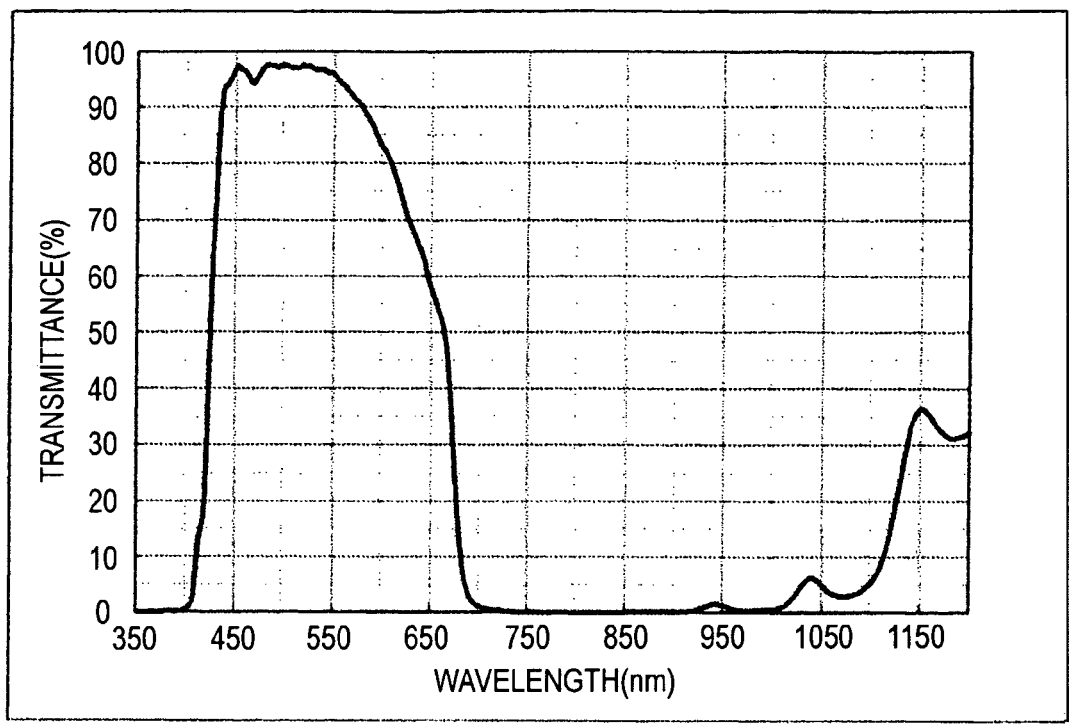
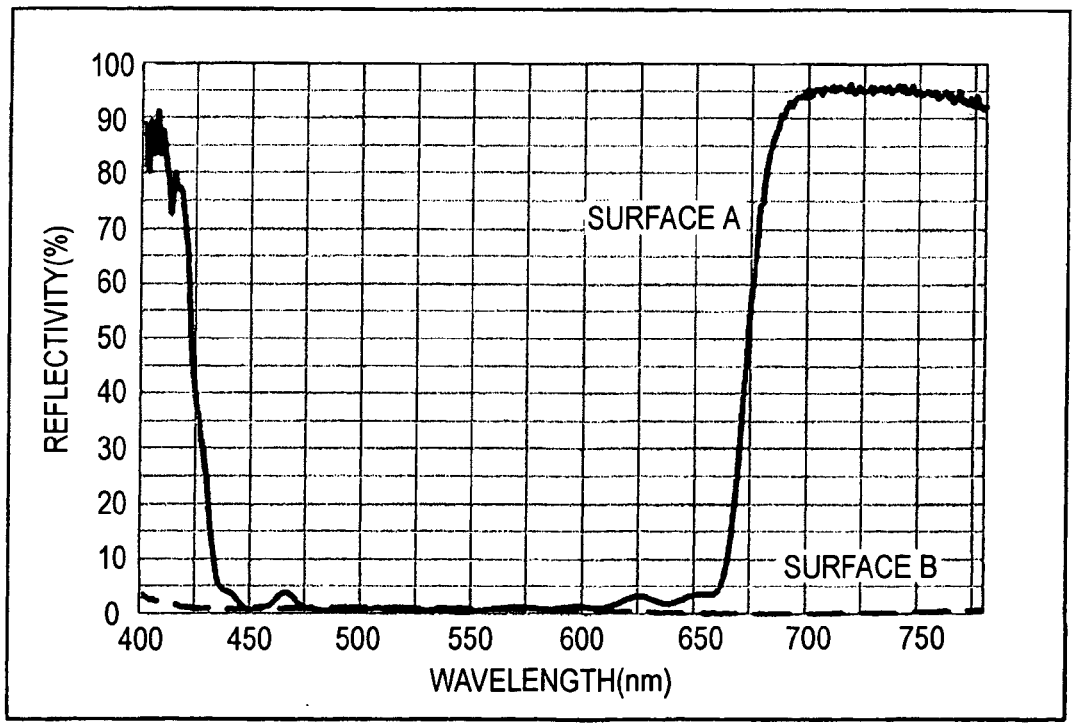

INFRARED-ABSORBING FILTER WITH MULTILAYER FILM IN IMAGING OPTICAL SYSTEM

CROSS-REFERENCE TO RELATED APPLICATION

The present application claims priority from Japanese Patent Application No. JP 2009-195506 filed in the Japan Patent Office on Aug. 26, 2009, the entire content of which is incorporated herein by reference.

BACKGROUND OF THE INVENTION

1. Field of the Invention

The present invention relates to the technical field of optical elements, imaging optical systems and imaging apparatuses, specifically to the technical field in which the spectral characteristics of incident light on an imaging device are adjusted to desirably improve characteristics such as color reproducibility in the red region.

2. Description of the Related Art

There have been recent demands for miniaturization of imaging apparatuses, such as digital video cameras and digital still cameras, with maintained image quality for pictures and videos.

To meet such demands, imaging apparatuses have been proposed that include a miniaturized imaging optical system, and a high-density CCD (Charge Coupled Device) or a high-density CMOS (Complementary Metal-Oxide Semiconductor) installed as an imaging device.

Generally, a number of techniques are known that realize high resolution to improve image quality in imaging optical systems that use an imaging device. Aside from high resolution, improving image quality involves another important factor—desirable color reproducibility for pictures and videos. The success or failure to ensure desirable color reproducibility is greatly influenced by the spectral characteristics of the optical element disposed on the light path.

For example, in one imaging apparatus of related art, an optical element having an infrared absorbing effect is disposed on the light path of an imaging optical system (see, for example, JP-A-2004-345680). In the imaging apparatus provided with such an optical element, desirable spectral characteristics need to be ensured for the optical element.

In response to the movement toward miniaturization of the imaging optical system or the lens barrel that houses the imaging optical system, there is an increasing tendency of the reflection ghost to occur by the reflection of light at the optical component of the lens barrel, particularly at the optical element including an multilayered film that interferes with ultraviolet rays and infrared rays. Suppression of the reflection ghost is therefore important to realize high image quality and miniaturization at the same time.

FIG. 10 to FIG. 12 are graphical representations of the spectral characteristics of an optical element of related art. In each figure, the upper graph represents the relationship between wavelength and spectral transmittance, and the lower graph represents the relationship between wavelength and the spectral reflectivity on each surface. In the lower graph, the symbols A and B denote the object-side surface and the image-side surface of the optical element, respectively.

FIG. 10 represents measurement values for the optical element that includes a base material formed of a clear glass plate, a spectra adjusting multilayered film formed on the object-side surface of the base material, and an antireflective film formed on the image-side surface of the base material.

FIG. 11 and FIG. 12 represent measurement values for two types of optical elements that include a base material formed of an infrared absorbing glass, a spectra adjusting multilayered film formed on the object-side surface of the base material, and an antireflective film formed on the image-side surface of the base material.

As represented in FIG. 10, the spectral transmittance abruptly varies near 650 nm in the optical element that uses a clear glass plate for the base material, because the base material does not have an infrared absorbing effect. Thus, unlike the optical elements represented in FIG. 11 and FIG. 12, unnecessary light is incident on the imaging device.

It is known that the wavelengths of light that tend to contribute to red reflection ghost are from about 600 nm to about 680 nm. The spectral reflectivity is high in this wavelength region in all of the optical elements represented in FIG. 10 to FIG. 12, and the red reflection ghost is likely to occur.

SUMMARY OF THE INVENTION

The imaging apparatus of related art including an optical element that has an infrared absorbing effect has high resolution with which high image quality can be realized. However, the red reflection ghost makes the color reproducibility insufficient.

Further, because the optical element disposed on the light path of the imaging optical system has a certain thickness, the imaging apparatus is prevented from being sufficiently reduced in size.

Accordingly, there is a need for an optical element, an imaging optical system, and an imaging apparatus with which the foregoing problems can be solved, and that can realize desirable color reproducibility in the red region while achieving miniaturization.

According to an embodiment of the present invention, there is provided an optical element that includes:

a base material formed of a film-like resin material that has an infrared absorbing effect; and a multilayered film that adjusts spectral characteristics, and is formed on an object-side surface and an image-side surface of the base material.

The optical element is disposed on a light path of an imaging optical system, and of such characteristics that its spectral transmittance, and its spectral reflectivities on the object-side surface and the image-side surface satisfy the following conditions (1) to (4):

$$0.75 < T_{IRCF(600)}/T_{IRCF(540)} < 0.95 \quad (1)$$

$$615 < \lambda_{LT50\%} < 670 \quad (2)$$

$$|T_{IRCF(700)}/T_{IRCF(540)}| < 0.05 \quad (3)$$

$$680 \leq \lambda_{LR50\%}, \quad (4)$$

where $T_{IRCF(600)}$ is the spectral transmittance of light with a wavelength of 600 nm, $T_{IRCF(540)}$ is the spectral transmittance of light with a wavelength of 540 nm, $\lambda_{LT50\%}$ is the wavelength of near-infrared light at 50% spectral transmittance, $T_{IRCF(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, in the optical element, the base material absorbs infrared rays, and the multilayered films adjust the spectral characteristics. As a result, the spectral reflectivity decreases in the red region.

It is preferable that the optical element be disposed between an imaging device and a lens disposed closest to an image in the imaging optical system.

By the arrangement in which the optical element is disposed between the imaging device and the lens disposed closest to the image in the imaging optical system, the optical element is disposed at such a position that the principal ray and the peripheral rays are brought close to each other.

In the optical element, it is preferable that the spectral reflectivities on the object-side surface and the image-side surface satisfy the following condition (5):

$$\lambda_{LR50\%}[A] \geq \lambda_{LR50\%}[B], \quad (5)$$

where $\lambda_{LR50\%}[A]$ is the wavelength of near-infrared light at 50% spectral reflectivity on the object-side surface, and $\lambda_{LR50\%}[B]$ is the wavelength of near-infrared light at 50% spectral reflectivity on the image-side surface.

By satisfying the condition (5), the spectral reflectivity and the reflected wavelength region from the red wavelength region to the near-infrared region become greater on the image-side surface than on the object-side surface.

In the optical element, it is preferable that a total thickness of the base material and the multilayered films formed on the both surfaces of the base material be 120 μm or less.

The thickness can be reduced when the total thickness of the base material and the multilayered films is 120 μm or less.

In the optical element, it is preferable that the base material be made of polyolefinic resin.

With the base material made of polyolefinic resin, excellent optical performance and heat resistance, and low water absorbability can be ensured.

In the optical element, it is preferable that the base material contain at least one kind of organic pigment as a colorant that has an infrared absorbing effect.

In the base material that contains at least one kind of organic pigment as a colorant that has an infrared absorbing effect, the colorant can be desirably mixed with the base material.

According to another embodiment of the present invention, there is provided an imaging optical system that includes at least one lens or lens element, an optical element, and an imaging device that are disposed on a light path.

The optical element includes a base material formed of a film-like resin material that has an infrared absorbing effect, and a multilayered film that adjusts spectral characteristics, and is formed on an object-side surface and an image-side surface of the base material.

The optical element is of such characteristics that its spectral transmittance, and its spectral reflectivities on the object-side surface and the image-side surface satisfy the following conditions (1) to (4):

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, in the imaging optical system, the base material absorbs infrared rays, and the multilayered films adjust the spectral characteristics. As a result, the spectral reflectivity decreases in the red region.

According to still another embodiment of the present invention, there is provided an imaging apparatus that includes an imaging optical system that includes at least one lens or lens element, an optical element, and an imaging device that are disposed on a light path.

The optical element includes a base material formed of a film-like resin material that has an infrared absorbing effect, and a multilayered film that adjusts spectral characteristics, and is formed on an object-side surface and an image-side surface of the base material.

The optical element is of such characteristics that its spectral transmittance, and its spectral reflectivities on the object-side surface and the image-side surface satisfy the following conditions (1) to (4):

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, in the imaging apparatus, the base material absorbs infrared rays, and the multilayered films adjust the spectral characteristics. As a result, the spectral reflectivity decreases in the red region.

The optical element according to the embodiment of the present invention includes:

a base material formed of a film-like resin material that has an infrared absorbing effect; and a multilayered film that adjusts spectral characteristics, and is formed on an object-side surface and an image-side surface of the base material.

The optical element is disposed on a light path of an imaging optical system, and of such characteristics that its spectral transmittance, and its spectral reflectivities on the object-side surface and the image-side surface satisfy the following conditions (1) to (4):

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, desirable color reproducibility can be realized in the red region while achieving miniaturization.

According to the embodiment of the invention, the optical element is disposed between the imaging device and the lens disposed closest to the image in the imaging optical system. In this way, deterioration in the resolution of the imaging optical system can be suppressed, and the amount of back focus deviation that may occur in manufacture or in response to temperature changes can be reduced.

According to the embodiment of the invention, the spectral reflectivities on the object-side surface and the image-side surface satisfy the following condition (5):

$$\lambda_{LR50\%}[A] \geq \lambda_{LR50\%}[B], \quad (5)$$

where $\lambda_{LR50\%}[A]$ is the wavelength of near-infrared light at 50% spectral reflectivity on the object-side surface, and $\lambda_{LR50\%}[B]$ is the wavelength of near-infrared light at 50% spectral reflectivity on the image-side surface.

In this way, a red ghost can be suppressed, and image quality can be improved.

According to the embodiment of the invention, the total thickness of the base material and the multilayered films formed on the both surfaces of the base material is 120 μm or less. In this way, the thickness can be sufficiently reduced.

According to the embodiment of the invention, the base material is made of polyolefinic resin. In this way, desirable characteristics can be ensured even when used under severe temperature and moisture conditions.

According to the embodiment of the invention, the base material contains at least one kind of organic pigment as a colorant that has an infrared absorbing effect. In this way, the colorant can be desirably mixed with the base material, making it possible to uniformly mix the colorant with the base material.

The imaging optical system according to the embodiment of the invention includes at least one lens or lens element, an optical element, and an imaging device that are disposed on a light path.

The optical element includes a base material formed of a film-like resin material that has an infrared absorbing effect, and a multilayered film that adjusts spectral characteristics, and is formed on an object-side surface and an image-side surface of the base material.

The optical element is of such characteristics that its spectral transmittance, and its spectral reflectivities on the object-side surface and the image-side surface satisfy the following conditions (1) to (4):

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, desirable color reproducibility can be realized in the red region while achieving miniaturization.

The imaging apparatus according to the embodiment of the invention includes an imaging optical system that includes at least one lens or lens element, an optical element, and an imaging device that are disposed on a light path.

The optical element includes a base material formed of a film-like resin material that has an infrared absorbing effect, and a multilayered film that adjusts spectral characteristics, and is formed on an object-side surface and an image-side surface of the base material.

The optical element is of such characteristics that its spectral transmittance, and its spectral reflectivities on the object-side surface and the image-side surface satisfy the following conditions (1) to (4):

$$0.75 < T_{IRCF\,(600)}/T_{IRCF\,(540)} < 0.95 \quad (1)$$

$$615 < \lambda_{LT50\%} < 670 \quad (2)$$

$$|T_{IRCF\,(700)}/T_{IRCF\,(540)}| < 0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

In this way, desirable color reproducibility can be realized in the red region while achieving miniaturization.

BRIEF DESCRIPTION OF THE DRAWINGS

FIG. 5 is a graphical representation of the spectral transmission characteristic and the spectral reflectivity characteristic of an optical element of First Example.

FIG. 6 is a graphical representation of the spectral transmission characteristic and the spectral reflectivity characteristic of an optical element of Second Example.

FIG. 7 is a graphical representation of the spectral transmission characteristic and the spectral reflectivity characteristic of an optical element of Third Example.

FIG. 10 is a graphical representation of the spectral transmission characteristic and the spectral reflectivity characteristic of an optical element of related art.

FIG. 11 is a graphical representation of the spectral transmission characteristic and the spectral reflectivity characteristic of another optical element of related art.

FIG. 12 is a graphical representation of the spectral transmission characteristic and the spectral reflectivity characteristic of yet another optical element of related art.

DESCRIPTION OF THE PREFERRED EMBODIMENTS

Embodiments of an optical element, an imaging optical system, and an imaging apparatus of the present invention are described below with reference to the accompanying drawings.

The embodiments described below are based on application of an imaging apparatus of an embodiment of the present invention to a digital still camera, application of an imaging optical system of an embodiment of the present invention to the imaging optical system of the digital still camera, and application of an optical element of an embodiment of the present invention to the optical element of the imaging optical system.

It should be noted that the applicable areas of the present invention are not just limited to digital still cameras, the imaging optical system of digital still cameras, and the optical element of imaging optical systems. For example, the invention is applicable to a wide range of digital video cameras, cameras incorporated in cellular phones, personal computers, and PDAs (Personal digital Assistants), imaging optical systems provided in a variety of cameras, and optical elements provided in a variety of imaging optical systems.

[Overall Configuration]

Figure 1:
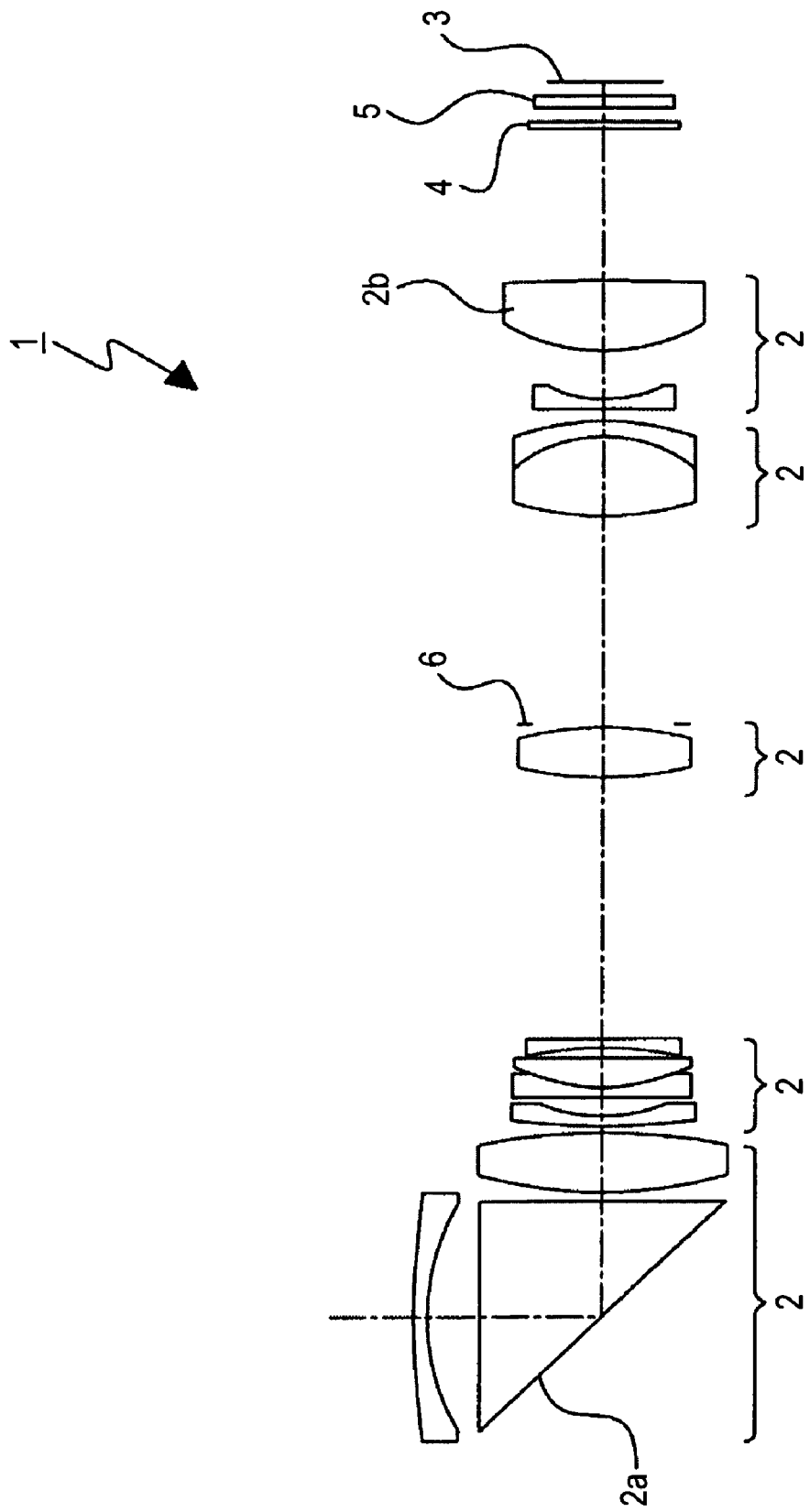
FIG. 1 is a schematic diagram illustrating a configuration of an imaging apparatus according to an embodiment of the present invention, shown in conjunction with FIG. 2 to FIG. 9.

As illustrated in FIG. 1, an imaging apparatus (digital still camera) 1 includes, for example, five lens elements 2, and an imaging device 3, such as a CCD and a CMOS, disposed on a light path. The imaging apparatus 1 illustrated in FIG. 1 is of a five-element configuration; however, this is merely an example, and the imaging apparatus 1 may include any number of lens elements 2. The lens element (first lens element) 2 closest to the object has a prism 2a that bends the light path 90°.

The imaging device 3 is disposed closest to the image on the light path.

An optical element 4 is disposed between the imaging device 3 and a lens 2b disposed closest to the image in the lens element (fifth lens element) 2 closest to the image.

A cover glass 5 is disposed between the optical element 4 and the imaging device 3. An aperture stop 6 is disposed on the image side of the lens element (third lens element) 2, disposed thirdly in the order of the lens elements 2 relative to the direction from the object side to the image side.

The lens elements 2, the imaging device 3, the optical element 4, the cover glass 5, and the aperture stop 6 are among the members of the imaging apparatus 1 that realize the imaging optical system.

The imaging apparatus 1 including the prism 2a can be reduced in thickness, because the prism 2a bends the light path at right angle.

[Configuration of Optical Element]

Figure 2:
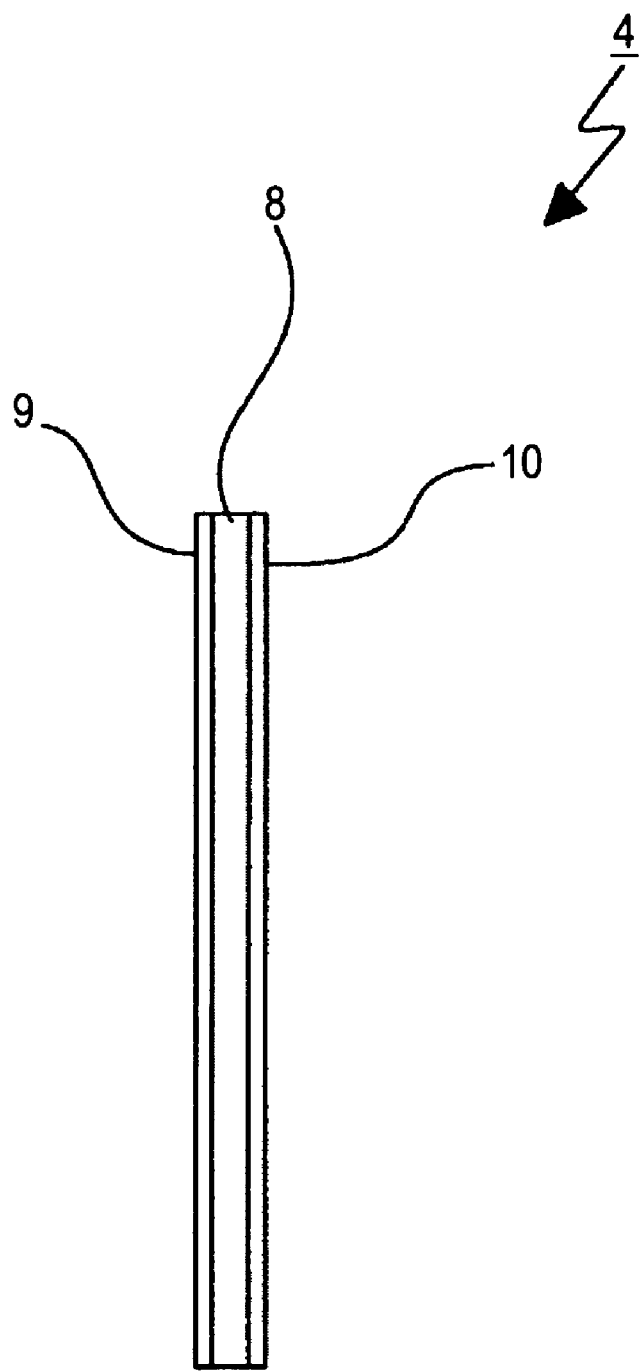
FIG. 2 is a schematic diagram illustrating a configuration of an optical element.

The optical element 4 has an infrared absorbing effect, and, as illustrated in FIG. 2, includes a base material 8 formed of a film-like resin material, and multilayered films 9 and 10 formed on the object-side surface and the image-side surface, respectively, of the base material 8.

The optical element 4 can have a sufficiently reduced thickness because the base material 8 is formed of a film-like material. This enables the imaging optical system and the imaging apparatus 1 to be reduced in size, particularly in the normal thickness of the imaging apparatus of a so-called retractable type, in which the lens barrel is retracted when not in use, and extends for shooting.

The total thickness of the base material 8 and the multilayered films 9 and 10 in the optical element 4 is preferably 120 μm or less, because it makes the advantageous effect of thickness reduction more prominent.

The base material 8 has an infrared absorbing effect, specifically an absorbing characteristic from the red wavelength region to the near infrared ray region (about 540 nm to about 700 nm).

This enables the balance of the spectral intensities of incident light on the imaging device 3 (for example, the balance of the light intensities of the blue region, green region, and red region) to be optimally adjusted, making it possible to desirably perform the white balance adjustment and color reproduction of pictures and videos.

Chromatic noise due to over electrical color adjustment also can be prevented.

Further, the red reflection ghost generated in the imaging optical system by the reflection of unnecessary light and that may cause deterioration of image quality can be suppressed to improve image quality.

Further, because the optical element 4 includes the multilayered films 9 and 10 that adjust spectral characteristics on the both surfaces of the base material 8, the spectral characteristics, which cannot be adjusted sufficiently with the near-infrared region absorbing characteristic of the base material 8 alone, can be adjusted more delicately. As a result, transmission spectral characteristics can be ensured with which the color adjustment of pictures and videos can be optimally performed.

Further, because the multilayered films 9 and 10 are formed on the both surfaces of the base material 8, the stress due to the multilayered films 9 and 10 can balance on the both surfaces of the base material 8, even when the base material 8 is formed using a low rigid film-like resin material. It is therefore possible to minimize the extent of warpage or bending, and thus to improve the surface precision of the optical element 4. As a result, the optical performance of the imaging optical system can be prevented from deteriorating, and the occurrence of reflection ghost can be suppressed.

In order to maximize the effect of improving the surface precision of the optical element 4, it is preferable to provide essentially the same number of layers for the multilayered films 9 and 10 so that the stress can balance on the both surfaces of the base material 8.

The optical element 4 is configured so that the spectral transmittance and the spectral reflectivities on the object-side surface and the image-side surface satisfy the following conditions (1) to (4).

$$0.75 < T_{IRCF\,(600)}/T_{IRCF\,(540)} < 0.95 \tag{1}$$

$$615 < \lambda_{LT50\%} < 670 \tag{2}$$

$$|T_{IRCF\,(700)}/T_{IRCF\,(540)}|<0.05 \quad (3)$$

$$680 \leq \lambda_{LR50\%}, \quad (4)$$

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity.

The unit of wavelength is nm.

The conditions (1) to (3) specify the spectral transmission characteristic of the optical element 4 from the red wavelength region to the near-infrared region.

Above and below the range of condition (1), the light quantity near the wavelength 600 nm becomes overly unbalanced with respect to the light quantity in the other visible light region, making it difficult to adjust the white balance in color reproduction. Further, there will be a substantial incidence of chromic noise because of the excess electrical signal gain involved in image processing, leading to image quality deterioration.

Above the upper limit of condition (2), the transmission cutoff wavelength of infrared rays in the optical element 4 becomes too long, and the quantity of transmitted light and the transmitted wavelength region become too large in the near-infrared region, making it difficult to sufficiently perform the color adjustment of pictures and videos. For example, white balance adjustment becomes difficult. Another problem is the exposure of the imaging device 3 with the infrared region light, which cannot be visually perceived.

On the other hand, below the lower limit of condition (2), the transmission cutoff wavelength of infrared rays in the optical element 4 becomes too short, and the quantity of transmitted light and the transmitted wavelength region become too small in the red region, making it difficult to sufficiently perform the color adjustment of pictures and videos. The reproducibility of red and purple colors is particularly affected.

Above the upper limit of condition (3), the quantity of light near the wavelength 700 nm becomes too large, and the quantity of light in the near-infrared region incident on the imaging device 3 becomes excessive. This is detrimental to the color reproducibility of the output pictures and videos, particularly in red and black. For example, white balance adjustment becomes difficult. Another problem is the exposure of the imaging device 3 with the infrared region light, which cannot be visually perceived.

Condition (4) specifies the spectral reflectivity characteristic of the optical element 4 from the red wavelength region to the near-infrared region.

Below the lower limit of condition (4), the spectral reflectivity and the reflected wavelength region of the optical element 4 become too large from the red region to the infrared ray region. In this case, the red reflection ghost due to the reflected light off the optical element 4 becomes notable, leading to a serious deterioration in image quality. The red reflection ghost occurs by the reflection, for example, between the imaging device 3 or the lenses of the imaging optical system and the optical element 4.

The red reflection ghost becomes more frequent as the incident angle of the ghost-causing light on the optical element 4 increases, because it increases the interference of the multilayered films 9 and 10 on the incident light on the optical element 4. Thus, the red reflection ghost, in particular, is more likely to occur when the incident angle of the ghost-causing light on the optical element 4, or the density of the incident light on the optical element 4 is increased as a result of reducing the size of the imaging optical system and the imaging apparatus 1.

As described above, with the optical element 4 satisfying the conditions (1) to (4), the red reflection ghost can be suppressed. In addition, a desirable white balance can be ensured, and desirable color reproducibility can be realized concerning the red region. As a result, image quality can be greatly improved. Specifically, desirable color reproducibility can be ensured concerning the red region by satisfying the conditions (1) to (4), even when the incident angle of the ghost-causing light on the optical element 4, or the density of the incident light on the optical element 4 is increased as a result of reducing the size of the imaging apparatus 1, as described above.

In the imaging apparatus 1, the optical element 4 is disposed between the imaging device 3 and the lens 2b disposed closest to the image in the imaging optical system.

With the optical element 4 disposed between the lens 2b and the imaging device 3, disturbance or deterioration due to spherical aberration can be reduced more than when the optical element 4 is disposed in the vicinity of the aperture stop 6 where the principal ray and the peripheral rays are distant apart. As a result, deterioration in the resolution of the imaging optical system can be suppressed, and the amount of back focus deviation that may occur in manufacture or in response to temperature changes can be reduced.

Generally, an imaging apparatus including an imaging device is designed like an image-side telecentric system, in order to make the field illuminance of the imaging optical system uniform. Designed like an image-side telecentric system, the size of the imaging optical system can be reduced by the optical design that allows a space to be formed relatively easily between the imaging device and the lens disposed closest to the image in the imaging optical system.

Such a space can be used to dispose the optical element 4 between the imaging device 3 and the lens 2b disposed closest to the image on the light path as in the imaging apparatus 1, making it possible to readily reduce the size of the imaging apparatus 1.

In the imaging apparatus 1, it is preferable that the spectral reflectivities of the optical element 4 on the object-side and image-side surfaces satisfy the following condition (5):

$$\lambda_{LR50\%}[A] \geq \lambda_{LR50\%}[B] \quad (5)$$

where $\lambda_{LR50\%}[A]$ is the wavelength of near-infrared light at 50% spectral reflectivity on the object-side surface, and $\lambda_{LR50\%}[B]$ is the wavelength of near-infrared light at 50% spectral reflectivity on the image-side surface.

Condition (5) specifies the orientation of the optical element 4. Specifically, it specifies that the surface of the optical element 4 having a higher spectral reflectivity from the red wavelength region to the near-infrared region is on the side of the imaging device 3.

When the optical element 4 is disposed oppositely so as not to satisfy condition (5), the spectral reflectivity and the reflected wavelength region from the red wavelength region to the near-infrared region become greater on the object-side surface than on the image-side surface. In this case, the red reflection ghost due to the reflection between the optical element 4 and the optical members, such as the lenses 2, disposed on the object side of the optical element 4 becomes more frequent, and image quality deteriorates.

Reflection ghost still may occur between the image-side surface of the optical element 4 and the imaging device 3, even when the optical element 4 is disposed so as to satisfy condition (5). However, considering the number of reflection ghost patterns associated with the number of components that reflect light, the conditions of incident light angle, and the size and shape of the ghost image that appears in pictures and videos, the orientation of the optical element 4 satisfying the condition (5) yields better image quality than when the optical element 4 is disposed oppositely so as not to satisfy the condition (5).

Further, any reduction in image quality caused by the reflection ghost when the optical element 4 is disposed so as to satisfy condition (5) can be prevented when the optical element 4 satisfies conditions (1) to (4).

The base material 8 of the optical element 4 is formed using a film-like resin material. It is preferable to use, for example, polyolefinic resin as the material of the base material 8.

Polyolefinic resin is a material with a number of advantages, including excellent optical properties (high transmissivity, low birefringence, high Abbe number, etc.), high heat resistance, and low water absorbability. Thus, by using polyolefinic resin for the base material 8, the desirable characteristics of the optical element 4 can be maintained even when the imaging apparatus 1 is used under severe temperature and moisture conditions.

Further, polyolefinic resin is less expensive than the infrared absorbing glass used as the material of the base material in related art. Thus, by forming the base material 8 using polyolefinic resin, the manufacturing cost of the imaging apparatus 1 and the imaging optical system can be reduced.

Further, because polyolefinic resin has excellent moldability, the optical element 4 can be formed with a reduced thickness compared with using, for example, the infrared absorbing glass as the base material. For example, the thickness can be reduced to 120 µm or less to reduce the size of the imaging apparatus 1 and the imaging optical system.

When using polyolefinic resin for the base material 8 of the optical element 4 as above, it is preferable to mix the resin with an organic pigment colorant having optical absorption properties in the near-infrared region, for example, such as an anthocyanin pigment and a cyanine pigment, as the infrared absorbing material.

For example, there are many reports concerning improvements of heat resistance and light resistance in regard to anthocyanin pigments (see, for example, JP-A-2003-292810). Further, because anthocyanin pigments are natural colorants and are expected to have stable reliability even under extreme temperature conditions, anthocyanin pigments, unlike synthetic colorants, can easily overcome environmental concerns.

Further, with the use of an organic pigment as the infrared absorbing material, the colorant can be desirably mixed with the polyolefinic resin.

The imaging apparatus 1 has been described as including, for example, five lens elements 2. However, the optical element 4 may be provided in, for example, an imaging apparatus 1A or an imaging apparatus 1B, as described below (see FIG. 3 and FIG. 4).

Figure 3:
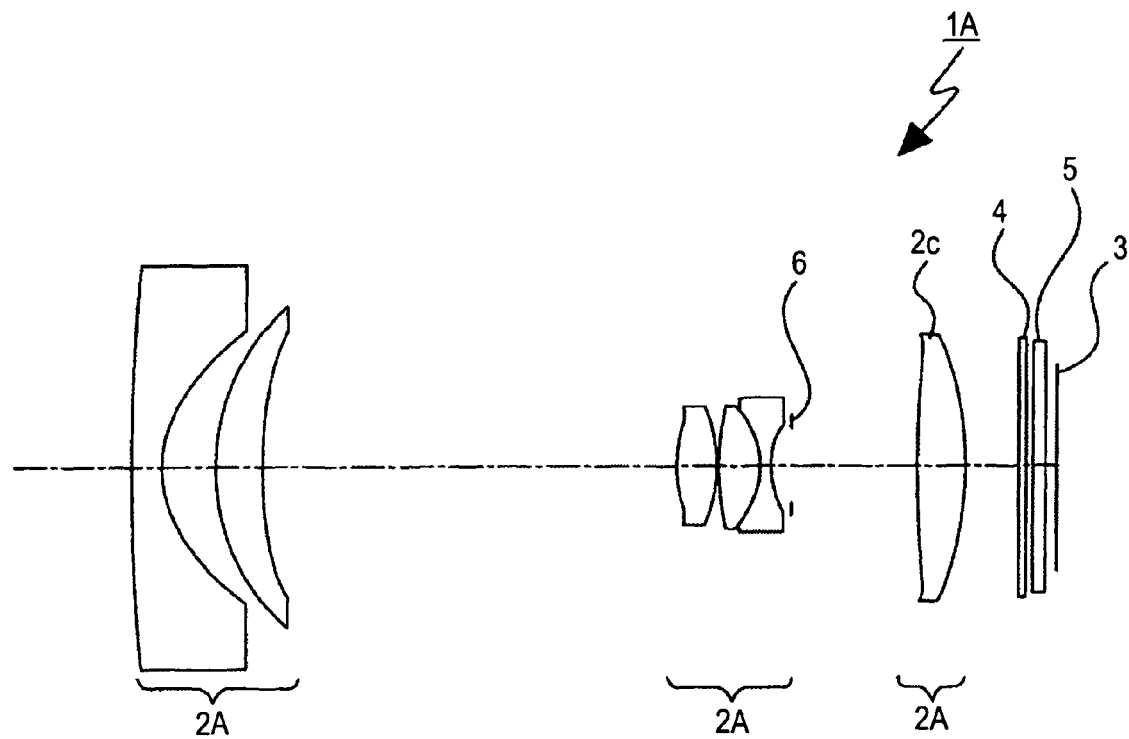
FIG. 3 is a schematic diagram illustrating another configuration of the imaging apparatus.

As illustrated in FIG. 3, the imaging apparatus 1A includes, for example, three lens elements 2A, and an imaging device 3, such as a CCD and a CMOS, disposed on the light path. The optical element 4 is disposed between the imaging device 3 and a lens 2c disposed closest to the image in the lens element (third lens element) 2A closest to the image.

A cover glass 5 is disposed between the optical element 4 and the imaging device 3. An aperture stop 6 is disposed on the image side of the lens element (second lens element) 2A, disposed secondary in the order of the lens elements 2A relative to the direction from the object side to the image side.

The lens elements 2A, the imaging device 3, the optical element 4, the cover glass 5, and the aperture stop 6 are among the members of the imaging apparatus 1A that realize the imaging optical system.

Figure 4:
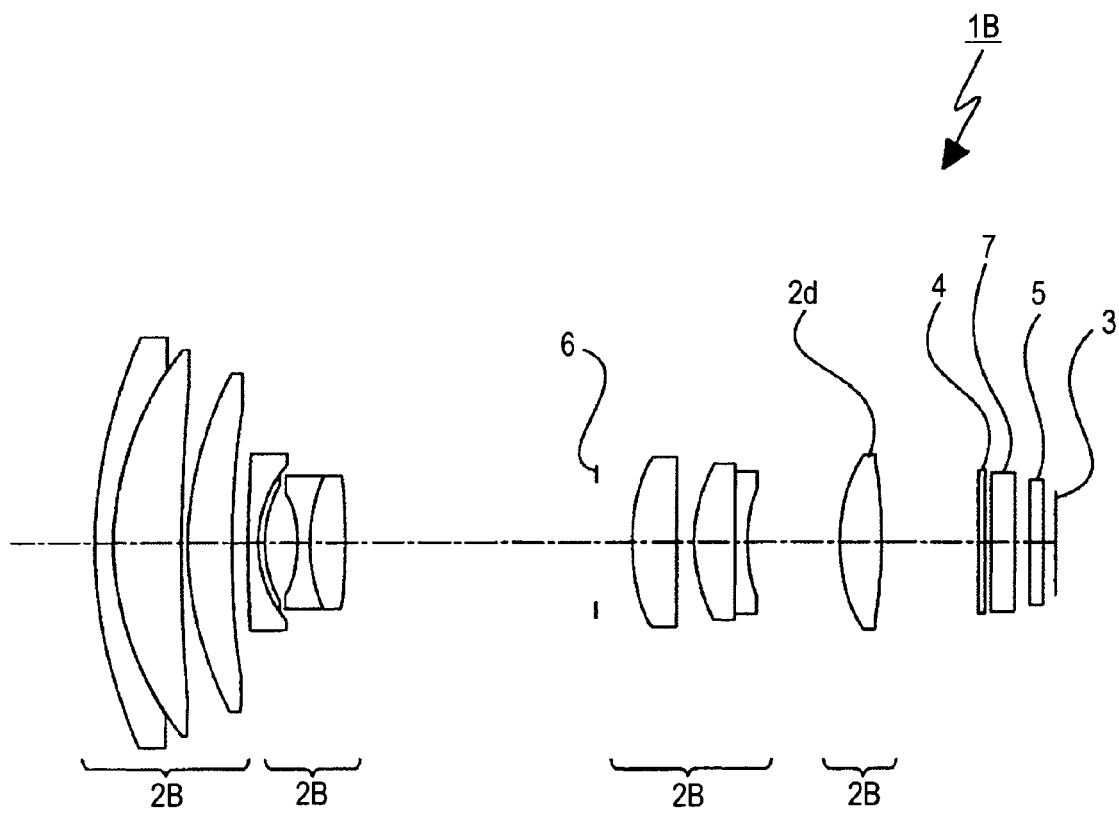
FIG. 4 is a schematic diagram illustrating yet another configuration of the imaging apparatus.

As illustrated in FIG. 4, the imaging apparatus 1B includes, for example, four lens elements 2B, and an imaging device 3, such as a CCD and a CMOS, disposed on the light path.

The optical element 4 is disposed between the imaging device 3 and a lens 2d disposed closest to the image in the lens element (fourth lens element) 2B closest to the image.

A low-pass filter 7 and a cover glass 5 are disposed in this order from the object side between the optical element 4 and the imaging device 3. An aperture stop 6 is disposed on the object side of the lens element (third lens element) 2B, disposed thirdly in the order of the lens elements 2B relative to the direction from the object side to the image side.

The lens elements 2B, the imaging device 3, the optical element 4, the cover glass 5, the aperture stop 6, and the low-pass filter 7 are among the members of the imaging apparatus 1B that realize the imaging optical system.

In the imaging apparatus 1B provided with the low-pass filter 7, the low-pass filter 7 can prevent the production of moire fringes.

EXAMPLES

Specific examples of the optical element 4 are described below with reference to FIG. 5 to FIG. 7. Note that, in the following First, Second, and Third Examples, the thickness of the optical element 4 is 100 µm. In the graphical representations of FIG. 5 to FIG. 7, the upper graph represents the relationship between wavelength and spectral transmittance, and the lower graph represents the relationship between wavelength and the spectral reflectivity on each surface. In the lower graph, surface A is the surface of the optical element 4 on the side of the object, and surface B is the surface of the optical element 4 on the side of the image.

FIG. 5 is a graphical representation of First Example.

In First Example, the following conditions (1) to (5) are satisfied.

$$T_{IRCF\,(600)}/T_{IRCF\,(540)} = 0.906 \tag{1}$$

$$\lambda_{LT50\%} = 650 \text{ nm} \tag{2}$$

$$|T_{IRCF\,(700)}/T_{IRCF\,(540)}| = 0.002 \tag{3}$$

$$\lambda_{LR50\%} = 729 \text{ nm}, 697 \text{ nm} \tag{4}$$

$$\lambda_{LR50\%}[A] = 729 \text{ nm}, \lambda_{LR50\%}[B] = 697 \text{ nm} \tag{5}$$

As represented in FIG. 5, in First Example, the spectral transmittance gradually decreases toward the longer wavelength side in the red region (wavelengths of about 600 nm to about 700 nm).

On both surface A and surface B, the spectral reflectivity is low at the wavelengths of about 600 nm to about 680 nm—a wavelength region of light that tends to contribute to red reflection ghost—, and is high in the region on the longer wavelength side.

Thus, in First Example, a desirable white balance can be ensured, and desirable color reproducibility can be realized in the red region.

FIG. 6 is a graphical representation of Second Example.

In Second Example, the following conditions (1) to (5) are satisfied.

$$T_{IRCF(600)}/T_{IRCF(540)}=0.946 \quad (1)$$

$$\lambda_{LT50\%}=655 \text{ nm} \quad (2)$$

$$|T_{IRCF(700)}/T_{IRCF(540)}|=0.002 \quad (3)$$

$$\lambda_{LR50\%}=729 \text{ nm, } 697 \text{ nm} \quad (4)$$

$$\lambda_{LR50\%}[A]=729 \text{ nm, } \lambda_{LR50\%}[B]=697 \text{ nm} \quad (5)$$

As represented in FIG. 6, in Second Example, the spectral transmittance gradually decreases toward the longer wavelength side in the red region (wavelengths of about 600 nm to about 700 nm).

On both surface A and surface B, the spectral reflectivity is low at the wavelengths of about 600 nm to about 680 nm—a wavelength region of light that tends to contribute to red reflection ghost—, and is high in the region on the longer wavelength side.

Thus, in Second Example, a desirable white balance can be ensured, and desirable color reproducibility can be realized in the red region.

FIG. 7 is a graphical representation of Third Example.

In Third Example, the following conditions (1) to (5) are satisfied.

$$T_{IRCF(600)}/T_{IRCF(540)}=0.807 \quad (1)$$

$$\lambda_{LT50\%}=622 \text{ nm} \quad (2)$$

$$|T_{IRCF(700)}/T_{IRCF(540)}|=0.0001 \quad (3)$$

$$\lambda_{LR50\%}=739 \text{ nm, } 694 \text{ nm} \quad (4)$$

$$\lambda_{LR50\%}[A]=739 \text{ nm, } \lambda_{LR50\%}[B]=694 \text{ nm} \quad (5)$$

As represented in FIG. 7, in Third Example, the spectral transmittance gradually decreases toward the longer wavelength side in the red region (wavelengths of about 600 nm to about 700 nm).

On both surface A and surface B, the spectral reflectivity is low at the wavelengths of about 600 nm to about 680 nm—a wavelength region of light that tends to contribute to red reflection ghost—, and is high in the region on the longer wavelength side.

Thus, in Third Example, a desirable white balance can be ensured, and desirable color reproducibility can be realized in the red region.

Figure 8:
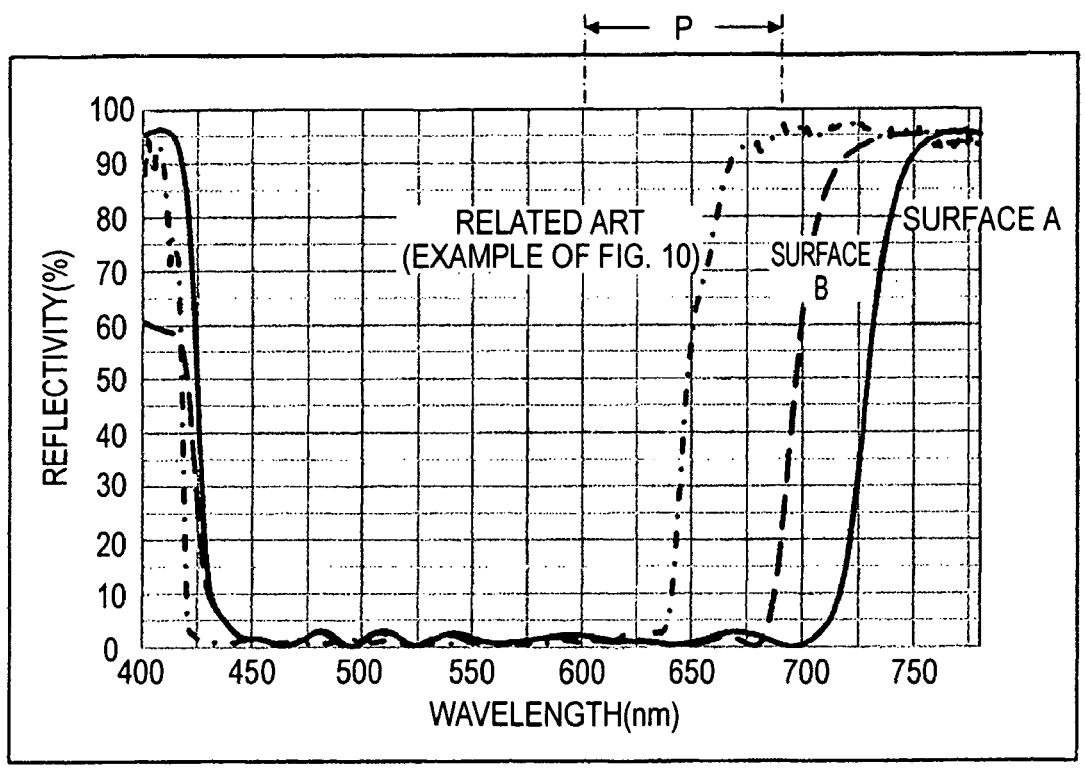
FIG. 8 is a graphical representation comparing the spectral reflectivity characteristic of the optical element of First Example with that of an optical element of related art.

As an example, FIG. 8 compares the spectral reflectivity of the optical element 4 of First Example with that of an optical element of related art (example represented in FIG. 10).

As represented in FIG. 8, the optical element of related art has high spectral reflectivity at the wavelengths of about 600 nm to about 680 nm—a wavelength region of light that tends to contribute to red reflection ghost—, whereas the optical element 4 has high spectral reflectivity on the longer wavelength side of the region of from about 600 nm to about 680 nm.

Thus, with the use of the optical element 4, the spectral reflectivity becomes high on the longer wavelength side of the wavelength region of light that tends to contribute to red reflection ghost. Accordingly, the red reflection ghost can be suppressed. As a result, a desirable white balance can be ensured, and desirable color reproducibility can be realized in the red region.

[Exemplary Configuration of Multilayered Film]

Table 1 presents an exemplary configuration of the multilayered films. In the table, the symbols A and B denote the surfaces of the optical element 4 on the object side and the image side, respectively. The multilayered film 9 and the multilayered film 10 of the optical element 4 represented in Table 1 have 19 layers and 17 layers, respectively.

TABLE 1

| Surface | Layer number | Film material | Physical thickness (nm) | Optical thickness (nd) |
|---|---|---|---|---|
| A | 1 | $SiO_2$ | 101.81 | $0.269\,\lambda_0$ |
|   | 2 | $Ta_2O_5$ | 40.56 | $0.160\,\lambda_0$ |
|   | 3 | $SiO_2$ | 210.19 | $0.556\,\lambda_0$ |
|   | 4 | $Ta_2O_5$ | 32.74 | $0.129\,\lambda_0$ |
|   | 5 | $SiO_2$ | 220.62 | $0.584\,\lambda_0$ |
|   | 6 | $Ta_2O_5$ | 31.61 | $0.125\,\lambda_0$ |
|   | 7 | $SiO_2$ | 221.29 | $0.585\,\lambda_0$ |
|   | 8 | $Ta_2O_5$ | 32.42 | $0.128\,\lambda_0$ |
|   | 9 | $SiO_2$ | 216.62 | $0.573\,\lambda_0$ |
|   | 10 | $Ta_2O_5$ | 32.99 | $0.130\,\lambda_0$ |
|   | 11 | $SiO_2$ | 187.10 | $0.495\,\lambda_0$ |
|   | 12 | $Ta_2O_5$ | 89.85 | $0.354\,\lambda_0$ |
|   | 13 | $SiO_2$ | 158.41 | $0.419\,\lambda_0$ |
|   | 14 | $Ta_2O_5$ | 88.20 | $0.347\,\lambda_0$ |
|   | 15 | $SiO_2$ | 157.49 | $0.417\,\lambda_0$ |
|   | 16 | $Ta_2O_5$ | 88.33 | $0.348\,\lambda_0$ |
|   | 17 | $SiO_2$ | 163.34 | $0.432\,\lambda_0$ |
|   | 18 | $Ta_2O_5$ | 112.65 | $0.444\,\lambda_0$ |
|   | 19 | $SiO_2$ | 139.97 | $0.370\,\lambda_0$ |
|   | Base Material |  |  |  |
| B | 20 | $SiO_2$ | 163.76 | $0.433\,\lambda_0$ |
|   | 21 | $Ta_2O_5$ | 98.89 | $0.389\,\lambda_0$ |
|   | 22 | $SiO_2$ | 151.72 | $0.401\,\lambda_0$ |
|   | 23 | $Ta_2O_5$ | 87.94 | $0.346\,\lambda_0$ |
|   | 24 | $SiO_2$ | 151.21 | $0.400\,\lambda_0$ |
|   | 25 | $Ta_2O_5$ | 80.23 | $0.316\,\lambda_0$ |
|   | 26 | $SiO_2$ | 158.32 | $0.419\,\lambda_0$ |
|   | 27 | $Ta_2O_5$ | 73.35 | $0.289\,\lambda_0$ |
|   | 28 | $SiO_2$ | 162.99 | $0.431\,\lambda_0$ |
|   | 29 | $Ta_2O_5$ | 72.29 | $0.285\,\lambda_0$ |
|   | 30 | $SiO_2$ | 161.26 | $0.427\,\lambda_0$ |
|   | 31 | $Ta_2O_5$ | 77.01 | $0.303\,\lambda_0$ |
|   | 32 | $SiO_2$ | 156.40 | $0.414\,\lambda_0$ |
|   | 33 | $Ta_2O_5$ | 83.25 | $0.328\,\lambda_0$ |
|   | 34 | $SiO_2$ | 155.75 | $0.412\,\lambda_0$ |
|   | 35 | $Ta_2O_5$ | 80.93 | $0.319\,\lambda_0$ |
|   | 36 | $SiO_2$ | 73.50 | $0.194\,\lambda_0$ |

* $\lambda_0 = 550$ nm

[Embodiment of Imaging Apparatus]

Figure 9:
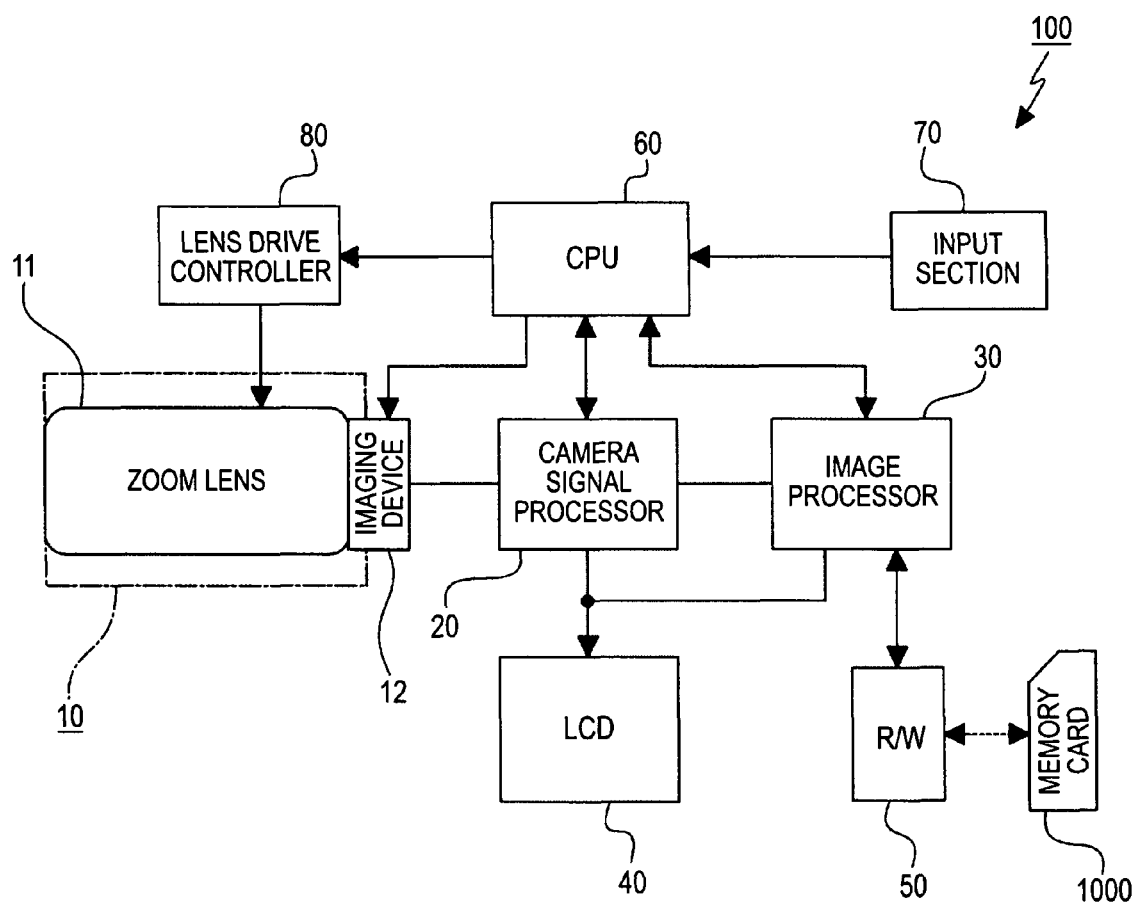
FIG. 9 is a block diagram illustrating an embodiment of an imaging apparatus of the present invention.

FIG. 9 is a block diagram illustrating a digital still camera as an embodiment of an imaging apparatus of the present invention.

A imaging apparatus (digital still camera) 100 includes a camera block 10, a camera signal processor 20, an image processor 30, an LCD (Liquid Crystal display) 40, a R/W (reader/writer) 50, a CPU (Central Processing Unit) 60, an input section 70, and a lens drive controller 80.

The camera block 10 has imaging functions. The camera signal processor 20 performs signal processing such as the analog-digital conversion of captured image signals. The image processor 30 performs recording and reproduction of image signals. The LCD 40 is provided to display information such as captured images. The R/W 50 performs the write and read of image signals to and from a memory card 1000. The CPU 60 controls the entire operation of the imaging apparatus 100. The input section 70 includes, for example, various switches manipulated by a user to perform necessary operations. The lens drive controller 80 controls the driving of the lenses disposed in the camera block 10.

The camera block 10 includes, for example, an imaging optical system including a zoom lens 11, and an imaging device 12 such as a CCD and a CMOS.

The camera signal processor 20 performs various types of signal processing, including digital conversion of output signals from the imaging device 12, noise removal, image quality compensation, and conversion into brightness and color-difference signals.

The image processor 30 performs, for example, compression coding and decompression decoding of image signals based on a predetermined image data format, and conversion of data specification such as resolution.

The LCD 40 displays information such as the state of user manipulation on the input section 70, and captured images.

The R/W 50 writes the image data encoded by the image processor 30 into the memory card 1000, and reads the recorded image data from the memory card 1000.

The CPU 60 serves as a control processor, controlling each circuit block of the imaging apparatus 100 based on, for example, input command signals from the input section 70.

The input section 70 includes, for example, a shutter release button with which a shutter is manipulated, and a select switch used to select an operation mode, and outputs input command signals to the CPU 60 in response to user manipulation.

The lens drive controller 80 controls, for example, motors that drive the lenses in the zoom lens 11, based on control signals from the CPU 60.

The memory card 1000 is, for example, a semiconductor memory detachably provided for the slot connected to the R/W 50.

The operation of the imaging apparatus 100 is described below.

During a standby mode for capturing, the captured image signals in the camera block 10 are output to the LCD 40 via the camera signal processor 20, and displayed as a camera through image, under the control of the CPU 60. Upon input of input command signals for zooming from the input section 70, the CPU 60 outputs control signals to the lens drive controller 80, and a predetermined lens in the zoom lens 11 is moved under the control of the lens drive controller 80.

When the shutter (not illustrated) of the camera block 10 is operated in response to the input command signal from the input section 70, the camera signal processor 20 outputs the captured image signals to the image processor 30 for compression coding, and the signals are converted into digital data of a predetermined data format. The converted data is output to the R/W 50, and written into the memory card 1000.

Note that focusing is performed when, for example, the shutter release button of the input section 50 is pressed halfway, or all the way for recording (capturing), upon which the lens drive controller 80 moves a predetermined lens in the zoom lens 11 for focusing based on control signals from the CPU 60.

For reproduction of the image data recorded in the memory card 1000, the R/W 50 reads predetermined image data from the memory card 1000 according to manipulation of the input section 70, and after decompression decoding by the image processor 30, reproduction image signals are output to the LCD 40 and the reproduced image is displayed.

The specific shapes and configurations of the members described in the preferred embodiments are merely exemplary in nature and have been described to simply embody the present invention. The foregoing description of the invention is thus not to be construed as being limiting the technical scope of the present invention.

What is claimed is:

1. An optical element comprising:
    a base material formed of a film-like resin material that has an infrared absorbing effect; and
    a multilayered film that adjusts spectral characteristics, and is formed on an object-side surface and an image-side surface of the base material,
    the optical element being disposed on a light path of an imaging optical system, and of such characteristics that its spectral transmittance, and its spectral reflectivities on the object-side surface and the image-side surface satisfy the following conditions (1) to (4)

$$0.75 < T_{IRCF\,(600)}/T_{IRCF\,(540)} < 0.95 \tag{1}$$

$$615 < \lambda_{LT50\%} < 670 \tag{2}$$

$$|T_{IRCF\,(700)}/T_{IRCF\,(540)}| < 0.05 \tag{3}$$

$$680 \leq \lambda_{LR50\%}, \tag{4}$$

where
    $T_{IRCF\,(600)}$ is the spectral transmittance of light with a wavelength of 600 nm,
    $T_{IRCF\,(540)}$ is the spectral transmittance of light with a wavelength of 540 nm,
    $\lambda_{LT50\%}$ is the wavelength of near-infrared light at 50% spectral transmittance,
    $T_{IRCF\,(700)}$ is the spectral transmittance of light with a wavelength of 700 nm, and
    $\lambda_{LR50\%}$ is the wavelength of near-infrared light at 50% spectral reflectivity,
    wherein the unit of the wavelength is nm.

2. The optical element according to claim 1, wherein the optical element is disposed between an imaging device and a lens disposed closest to an image in the imaging optical system.

3. The optical element according to claim 1, wherein the spectral reflectivities on the object-side surface and the image-side surface satisfy the following condition (5)

$$\lambda_{LR50\%}\,[A] \geq \lambda_{LR50\%}\,[B], \tag{5}$$

where $\lambda_{LR50\%}$ [A] is the wavelength of near-infrared light at 50% spectral reflectivity on the object-side surface, and $\lambda_{LR50\%}$ [B] is the wavelength of near-infrared light at 50% spectral reflectivity on the image-side surface.

4. The optical element according to claim 1, wherein a total thickness of the base material and the multilayered films formed on the both surfaces of the base material is 120 μm or less.

5. The optical element according to claim 1, wherein the base material is made of polyolefinic resin.

6. The optical element according to claim 1, wherein the base material contains at least one kind of organic pigment as a colorant that has an infrared absorbing effect.

7. An imaging optical system comprising:
    at least one lens or lens element;
    an optical element; and
    an imaging device that are disposed on a light path,
    the optical element including
        a base material formed of a film-like resin material that has an infrared absorbing effect, and
        a multilayered film that adjusts spectral characteristics, and is formed on an object-side surface and an image-side surface of the base material, and
    the optical element being of such characteristics that its spectral transmittance, and its spectral reflectivities on the object-side surface and the image-side surface satisfy the following conditions (1) to (4)

$$0.75 < T_{IRCF\,(600)}/T_{IRCF\,(540)} < 0.95 \tag{1}$$

$$615 < \lambda_{LT50\%} < 670 \tag{2}$$

$|T_{IRCF\,(700)}/T_{IRCF\,(540)}|<0.05$ (3)

$680 \leq \lambda_{LR50\%}$, (4)

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral transmittance of light with a wavelength of 700 nm, and $\lambda_{LR50\%}$ is the wavelength of near-infrared light at 50% spectral reflectivity, wherein the unit of the wavelength is nm.

8. An imaging apparatus comprising:

an imaging optical system that includes
  at least one lens or lens element,
  an optical element, and
  an imaging device that are disposed on a light path,
the optical element including
  a base material formed of a film-like resin material that has an infrared absorbing effect, and
  a multilayered film that adjusts spectral characteristics, and is formed on an object-side surface and an image-side surface of the base material, and the optical element being of such characteristics that its spectral transmittance, and its spectral reflectivities on the object-side surface and the image-side surface satisfy the following conditions (1) to (4)

$0.75<T_{IRCF\,(600)}/T_{IRCF\,(540)}<0.95$ (1)

$615<\lambda_{LT50\%}<670$ (2)

$|T_{IRCF\,(700)}/T_{IRCF\,(540)}|<0.05$ (3)

$680 \leq \lambda_{LR50\%}$, (4)

where $T_{IRCF\,(600)}$ is the spectral transmittance of light with a wavelength of 600 nm, $T_{IRCF\,(540)}$ is the spectral transmittance of light with a wavelength of 540 nm, $\lambda_{LT50\%}$ is the wavelength of near-infrared light at 50% spectral transmittance, $T_{IRCF\,(700)}$ is the spectral, transmittance of light with a wavelength of 700 nm, and $\lambda_{LR50\%}$ is the wavelength of near-infrared light at 50% spectral reflectivity, wherein the unit of the wavelength is nm.

* * * * *